(12) United States Patent
Lim et al.

(10) Patent No.: US 8,909,015 B2
(45) Date of Patent: Dec. 9, 2014

(54) COMPOSITION FOR HIGH STRENGTH LOOSE TUBE TYPE FIBER OPTIC CABLE WITH EXCELLENT FLEXIBILITY AND IMPACT RESISTANCE

(75) Inventors: Jeong-Eun Lim, Seoul (KR); Yu-Hyoung Lee, Daegu (KR); Gi-Joon Nam, Seoul (KR)

(73) Assignee: LS Cable & System Ltd., Anyang-si, Gyeonggi-do (KR)

( * ) Notice: Subject to any disclaimer, the term of this patent is extended or adjusted under 35 U.S.C. 154(b) by 170 days.

(21) Appl. No.: 13/551,944

(22) Filed: Jul. 18, 2012

(65) Prior Publication Data

US 2014/0023331 A1    Jan. 23, 2014

(51) Int. Cl.
*G02B 6/44*    (2006.01)

(52) U.S. Cl.
USPC .............................. 385/113; 385/109; 385/112

(58) Field of Classification Search
USPC ................................... 385/109–113; 526/348
See application file for complete search history.

(56) References Cited

U.S. PATENT DOCUMENTS

| | | | | |
|---|---|---|---|---|
| 5,761,362 A | * | 6/1998 | Yang et al. | 385/109 |
| 5,911,023 A | * | 6/1999 | Risch et al. | 385/100 |
| 6,085,009 A | * | 7/2000 | Risch et al. | 385/109 |
| 6,658,185 B2 | * | 12/2003 | Bosisio et al. | 385/109 |
| 8,031,997 B2 | * | 10/2011 | Overton | 385/110 |
| 2004/0197059 A1 | * | 10/2004 | Castellani et al. | 385/113 |
| 2006/0045439 A1 | * | 3/2006 | Brown et al. | 385/100 |
| 2008/0114142 A1 | | 5/2008 | Hicks et al. | |
| 2010/0135622 A1 | * | 6/2010 | Sasho et al. | 385/102 |

FOREIGN PATENT DOCUMENTS

JP    11-323041    11/1999

* cited by examiner

*Primary Examiner* — Daniel Petkovsek
(74) *Attorney, Agent, or Firm* — Sherr & Jiang, PLLC

(57) ABSTRACT

Disclosed is a composition for a high strength loose tube type fiber optic cable with excellent flexibility and excellent impact resistance, which includes a polypropylene-polyethylene copolymer having a melt flow index (MFI) of 1.1 g/10 minutes to 3.0 g/10 minutes at 230° C. and a flexural modulus of 10,000 to 23,000 kg/cm². A fiber optic cable including a loose tube formed with the composition for a high strength loose tube type fiber optic cable has excellent flexibility and impact resistance as well as excellent appearance.

1 Claim, 2 Drawing Sheets

COMPOSITION FOR HIGH STRENGTH LOOSE TUBE TYPE FIBER OPTIC CABLE WITH EXCELLENT FLEXIBILITY AND IMPACT RESISTANCE

BACKGROUND OF THE DISCLOSURE

1. Field of the Disclosure

The present disclosure relates to a composition for a high strength loose tube type fiber optic cable.

2. Description of the Related Art

A fiber optic cable is a cable having several optical fibers or optical fiber bundles surrounded by a sheath and suitably arranged to meet optical, mechanical and environmental conditions. It is a cutting-edge facility capable of rapidly transmitting a large amount of information over long distances. A fiber optic cable may be classified into various kinds depending on its classification criterion. In detail, the fiber optic cable may be classified into ribbon type fiber optic cables, tight butter type fiber optic cables, loose tube type fiber optic cables or the like according to the structure of optical fiber units and may also be classified into fiber optic cables for ducts, fiber optic cables for direct buried, fiber optic cables for aerial or the like according to the installation pattern.

Among them, the loose tube type fiber optic cable is generally configured as shown in FIG. 1. The loose tube type fiber optic cable is manufactured to include a central strength element 10 for endowing tensile resistance to the fiber optic cable, a plurality of fiber optic loose tube units 13 arranged to contact the central strength element 10, a reinforcing strength elements 15 surrounding the fiber optic loose tube units 13 and a sheath 16 surrounding the reinforcing strength elements. The central strength element 10 extends at the center of the fiber optic cable in the length direction of the fiber optic cable, and the fiber optic loose tube unit 13 is disposed to circumscribe the periphery of the central strength element 10 at regular intervals. In addition, the fiber optic loose tube unit 13 is composed of a plurality of optical fibers 11 and a loose tube 12 surrounding the optical fibers 11, and a jelly 14 is filled in a space formed in the fiber optic loose tube unit 13 for watertight configuration.

However, for environment-friendly and work convenience, the demand for gel-free all-dry type fiber optic cable is increasing. This fiber optic cable is configured as shown in FIG. 2. Talc powder and a water blocking yarn 24 are used in the fiber optic loose tube unit 23 of the fiber optic cable instead of the conventional gel for making it watertight.

Meanwhile, in order to protect the optical fiber 11 against external impacts and external environment (twist, compression, tension, temperature change or the like), the material used for the loose tube 12 must have excellent tensile resistance, excellent impact resistance, excellent flexibility, and small shrinkage or expansion. In order to satisfy these properties, conventional loose tubes were made of engineering plastic such as polybutylene telephthalate (PBT), polycarbonate (PC), polyamide (e.g., nylon-12) or the like. However, the engineering plastic is difficult to process and handle and is high in price. In addition, the engineering plastic has poor flexibility and is weak against water since it is hydrolyzed.

In order to overcome such drawbacks, a loose tube 12 having excellent flexibility and impact resistance has been manufactured by using a polypropylene-polyethylene copolymer. However, the polypropylene-polyethylene copolymer has bad workability since it has a low cooling speed and a high linear expansion coefficient in comparison to existing polybutylene telephthalate (PBT) or the like. In addition, the polypropylene-polyethylene copolymer deteriorates transmission characteristics of the optical fiber since its shrinkage rate after extrusion is great. In order to solve these problems, a technique of enhancing a cooling speed and minimizing a shrinkage rate by using a nucleating agent together with a polypropylene-polyethylene copolymer having a melt flow index (MFI) greater than 3 g/10 minutes and no greater than 10 g/10 minutes.

Meanwhile, with the development of a FTTH (Fiber To The Home) service, the demand on closures (or, pedestals) which play a role of protecting a contact point of a fiber optic cable against water or various environmental elements when the fiber optic cable is installed is increasing. In the closure, a fiber optic loose tube unit 13, 23 is wound circularly and stored for making an additional connection when necessary. Since the fiber optic loose tube unit is in a state where the central strength element 10, 20 and the sheath 16, 26 are removed, the fiber optic loose tube unit may be easily shrunken or expanded due to external environments (temperature, humidity or the like), and accordingly the length of the loose tube may decrease smaller than the optical fiber (EFL (Excess Fiber Length)>0) or increase greater than the optical fiber (EFL<0), which deteriorates a signal transmission capability of the optical fiber. In fact, many cases of inferior fiber optic cables using polypropylene fiber optic loose tube units have been reported, and it has been revealed that such inferiorities are caused since the loose tube of a fiber optic loose tube unit stored in the closure is shrunken to deteriorate the transmission capability of the fiber. As described above, in a fiber optic cable, the shrinkage rate of the loose tube is very important, and after inferior cases have occurred, Mid-span access-related standards have been established and managed in the U.S.A.

SUMMARY OF THE DISCLOSURE

The present disclosure is designed to solve the problems of the prior art, and therefore it is an object of the present disclosure to provide a composition for a loose tube type fiber optic cable with excellent flexibility, excellent impact resistance and excellent workability.

In one aspect, the present disclosure provides a composition for a high strength loose tube type fiber optic cable with excellent flexibility and excellent impact resistance, which includes a polypropylene-polyethylene copolymer having a melt flow index (MFI) of 1.1 g/10 minutes to 3.0 g/10 minutes at 230° C. and a flexural modulus of 10,000 to 23,000 kg/cm$^2$.

The fiber optic cable including a loose tube formed with the composition for a loose tube type fiber optic cable according to the present disclosure has excellent flexibility and excellent impact resistance as well as excellent appearance.

BRIEF DESCRIPTION OF THE DRAWINGS

Other objects and aspects of the present disclosure will become apparent from the following descriptions of the embodiments with reference to the accompanying drawings in which.

Figure 1:
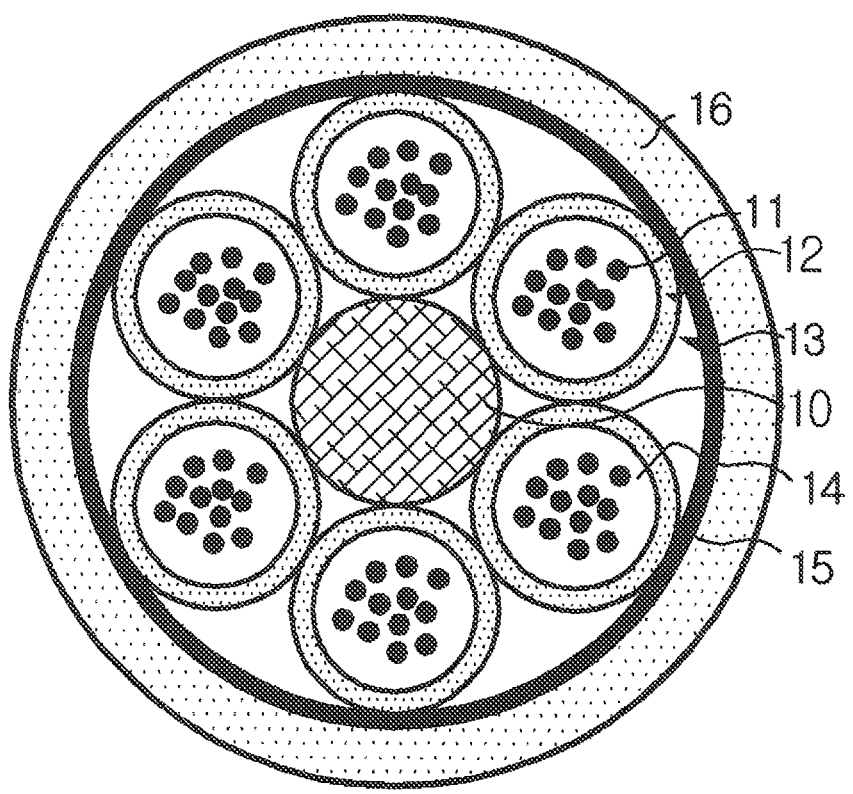
FIG. 1 is a cross-sectional view showing a general loose tube type fiber optic cable.
Figure 2:
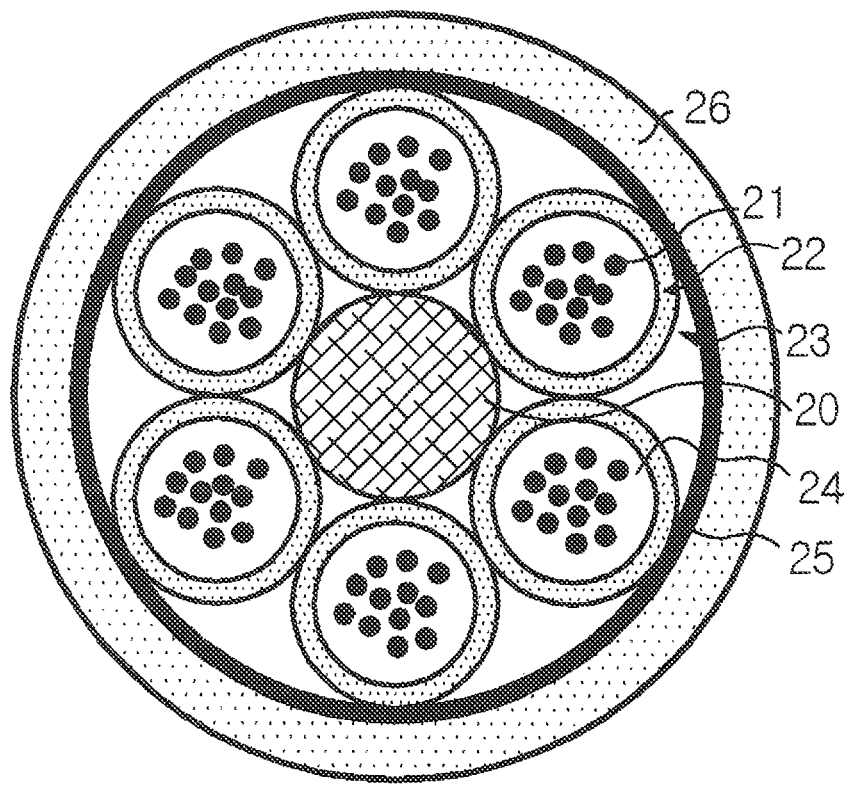
FIG. 2 is a cross-sectional view showing an all-dry type fiber optic cable.

REFERENCE SYMBOLS 10, 20: central strength element
11, 21: optical fiber
12, 22: loose tube
13, 23: fiber optic loose tube unit
14: jelly
15, 25: reinforcing strength elements
16, 26: sheath
24: talc powder and water blocking yarn

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

The present disclosure provides a composition for a high strength loose tube type fiber optic cable with excellent flexibility and excellent impact resistance, which includes a polypropylene-polyethylene copolymer having a melt flow index (MFI) of 1.1 g/10 minutes to 3.0 g/10 minutes at 230° C. and a flexural modulus of 10,000 to 23,000 kg/cm$^2$.

If the melt flow index (MFI) of the polypropylene-polyethylene copolymer is lower than 1.1 g/10 minutes at 230° C., the melt viscosity of the material may increase, which leads to irregular extrusion amount and bad processability at high line speeds. If the melt flow index (MFI) is higher than 3 g/10 minutes, the impact strength or flexural modulus may deteriorate, and the tube may droop due to very low viscosity of a tube which is being extruded, which leads to bad workability.

The flexural modulus of the polypropylene-polyethylene copolymer is preferably 10,000 to 23,000 kg/cm$^2$. If the flexural modulus is lower than 10,000 kg/cm$^2$, the loose tube may be squashed when being extruded, and so the loose tube may have an ellipse shape. If the flexural modulus is higher than, 23,000 kg/cm$^2$, the rigidity of the material may increase, which leads to bad impact resistance of the loose tube.

The Izod impact strength of the polypropylene-polyethylene copolymer is preferably higher than 10 kg·cm/cm. The Izod impact strength is energy required for cutting a test piece. If the polypropylene-polyethylene copolymer of the present disclosure has Izod impact strength lower than 10 kg·cm/cm, when an impact is applied to the manufactured fiber optic cable, cracks may be created at the surface of the loose tube, which may increase loss of the optical fiber.

The polypropylene-polyethylene copolymer of the present disclosure may be manufactured by appropriately copolymerizing polypropylene and polyethylene to have the above melt flow index (MFI), flexural modulus and Izod impact strength.

In addition, the composition for a high strength loose tube type fiber optic cable according to the present disclosure does not include a nucleating agent. In the related art, a nucleating agent has been used to enhance a cooling speed of the polypropylene-polyethylene copolymer, improve tensile resistance and impact strength and minimize a shrinkage rate after extrusion, the present disclosure does not have to use a nucleating agent since a polypropylene-polyethylene copolymer having a melt flow index (MFI) of 1.1 g/10 minutes to 3.0 g/10 minutes and flexural modulus of 10,000 to 23,000 kg/cm$^2$.

In addition, the present disclosure provides a fiber optic cable, which includes a loose tube formed with the above composition for a high strength loose tube type fiber optic cable.

Examples

Hereinafter, embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

In order to examine the change of performance according to the composition for a loose tube type fiber optic cable according to the present disclosure, compositions for a loose tube type fiber optic cable have been prepared according to examples and comparative examples based on the data of Table 1 below. The melt flow index was obtained at 230° C.

TABLE 1

|  |  | Examples | | | Comparative Examples | | | | |
| --- | --- | --- | --- | --- | --- | --- | --- | --- | --- |
|  |  | 1 | 2 | 3 | 1 | 2 | 3 | 4 | 5 |
| Polypropylene-polyethylene copolymer | Melt flow index (g/10 minutes) | 2.0 | 2.5 | 2.7 | 6.0 | 2.0 | 1.0 | 2.5 | — |
|  | Flexural modulus (kg/cm$^2$) | 17,000 | 14,000 | 11,000 | 9,000 | 16,000 | 13,000 | 24,000 | — |
|  | Izod impact strength (kg·cm/cm) | 15 | 25 | 50 | 50 | 5 | 45 | 7 | — |
|  | Elongation (%) | 280 | 300 | 350 | 350 | 150 | 250 | 30 | — |
| Polybutylene terephthalate | Melt flow index (g/10 minutes) | — | — | — | — | — | — | — | 8.5 |
|  | Flexural modulus (kg/cm2) | — | — | — | — | — | — | — | 23,000 |
|  | Izod impact strength (kg·cm/cm) | — | — | — | — | — | — | — | 7 |

Measurement and Evaluation of Properties

The compositions prepared according to Examples 1-3 and Comparative Examples 1-5 were put into an 45 mm extruder (L/D=24) to make loose tubes having an outer/inner diameter ratio of 2.4 mm/1.6 mm at 230 with a linear speed of 150 mpm, and then fiber optic cables having the loose tubes and configured as shown in FIG. 1 were manufactured in a common way. For test pieces of the loose tubes and the fiber optic cables according to Examples and Comparative Examples, ovality, flexibility, workability and impact resistance of the loose tubes were tested. The test results are shown in Table 2 below. The experiment conditions are briefly described below.

(a) Ovality of a Loose Tube

Ovality of a loose tube was calculated according to the following equation by using an outer diameter deviation of X axis and Y axis when the loose tube is extruded. The ovality should be lower than 0.4.

Ovality of a loose tube={(maximum diameter of the loose tube−minimum diameter of the loose tube)/design diameter of the loose tube}×100

In the above equation, the design diameter of the loose tube was set to be 2.4 mm.

(b) Flexibility

Flexibility of a loose tube was evaluated according to IEC 60794-I-1 G7. The flexibility was evaluated as good if no kink occurs.

(c) Workability

Workability of a loose tube was evaluated based on roughness of the appearance during extruding and regularity of an extrusion amount. At a linear speed of 150 mpm, the appearance should be smooth and the extrusion amount should be regular not to cause a deviation in outer diameter.

(d) Impact Resistance

Impact resistance of a cable was evaluated according to IEC 60794-1-E4. A crack should not be created.

TABLE 2

|  | Examples | | | Comparative Examples | | | | |
| --- | --- | --- | --- | --- | --- | --- | --- | --- |
|  | 1 | 2 | 3 | 1 | 2 | 3 | 4 | 5 |
| Ovality | 0.10 | 0.25 | 0.38 | 0.6 | 0.20 | 0.30 | 0.1 | 0.05 |
| Flexibility | No kink | No kink | No kink | No kink | No kink | No kink | Kink | Kink |
| Workability | Good | Good | Good | Good | Good | Bad | Good | Good |
| Impact resistance | No crack | No crack | No crack | No crack | Crack | No crack | Crack | No crack |

As shown in Table 2, the test pieces of Examples 1-3 had ovality within a specific range and also exhibited good results in terms of flexibility, workability and impact resistance.

Meanwhile, in Comparative Example 1, the ovality of the loose tube was not within a specific range and the loose tube was crushed. This result was caused since Comparative Example 1 used a polypropylene-polyethylene copolymer with a high melt flow index and low flexural modulus.

In Comparative Example 2, cracks were created at the prepared fiber optic cable. This result was caused since Comparative Example 2 used a polypropylene-polyethylene copolymer with low impact strength.

In Comparative Example 3, when the loose tube was manufactured, the extrusion amount was irregular due to an increased extrusion load. Therefore, a deviation was found in outer diameter of the loose tube, and the loose tube was broken, which leaded to bad workability. This result was caused because a polypropylene-polyethylene copolymer with a low melt flow index was used.

In Comparative Example 4, a kink was found at the loose tube, which leaded to bad flexibility. In addition, when impact resistance was evaluated at the prepared fiber optic cable, cracks were created. This result was caused since a polypropylene-polyethylene copolymer with low flexibility and impact strength was used due to very high flexural modulus.

In Comparative Example 5, a kink was found at the loose tube, which leaded to bad flexibility. This result was caused since a polybutylene terephthalate with low impact strength was used.

Optimal embodiments of the present disclosure have been disclosed as above. Even though specific terms have been used in the above embodiments, they are just for better understanding of the present disclosure and not intended to restrict the meaning of the present disclosure or to limit the scope of the present disclosure defined in the appended claims.

What is claimed is:

1. A loose tube type fiber optic cable, comprising:
a central tensile wire for endowing tensile strength to the optical cable;
a plurality of loose tube optical units arranged to contact the central tensile wire and each having a plurality of optical fibers and a loose tube surrounding the optical fibers;
a reinforcing member surrounding the loose tube optical units; and
a sheath surrounding the reinforcing member,
wherein the loose tube consisting essentially of a polypropylene-polyethylene copolymer having a melt flow index (MFI) of 1.1 g/10 minutes to 3.0 g/10 minutes at 230° C., a flexural modulus of 10,000 to 23,000 kg/cm$^2$, and an Izod impact strength of 10 kgf·cm/cm or above, wherein the polypropylene-polyethylene copolymer does not include a nucleating agent.

* * * * *